(12) United States Patent
Hollister et al.

(10) Patent No.: US 11,547,252 B2
(45) Date of Patent: *Jan. 10, 2023

(54) PRODUCT MONITORING DEVICE

(71) Applicant: Hunter James Hollister, Mooresville, NC (US)

(72) Inventors: Hunter James Hollister, Mooresville, NC (US); Adam Yeakley, Cornelius, NC (US)

(73) Assignee: Hunter James Hollister, Mooresville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,534

(22) Filed: Jul. 9, 2021

(65) Prior Publication Data

US 2021/0330143 A1    Oct. 28, 2021

Related U.S. Application Data

(63) Continuation of application No. 16/829,739, filed on Mar. 25, 2020, now Pat. No. 11,071,416.

(60) Provisional application No. 62/823,003, filed on Mar. 25, 2019.

(51) Int. Cl.
| | |
|---|---|
| *A47K 10/38* | (2006.01) |
| *G08B 21/18* | (2006.01) |
| *G01S 15/08* | (2006.01) |
| *G01S 17/08* | (2006.01) |
| *A47K 10/32* | (2006.01) |

(52) U.S. Cl.
CPC ............ *A47K 10/38* (2013.01); *G08B 21/182* (2013.01); *A47K 2010/3226* (2013.01); *G01S 15/08* (2013.01); *G01S 17/08* (2013.01)

(58) Field of Classification Search
CPC ............ A47K 10/38; A47K 2010/3226; G08B 21/182; G01S 15/08; G01S 17/08
See application file for complete search history.

(56) References Cited

U.S. PATENT DOCUMENTS

| | | | | |
|---|---|---|---|---|
| 4,969,016 A | * | 11/1990 | Kudoh | G03G 15/6517 83/342 |
| 5,223,854 A | * | 6/1993 | Shimizu | G03B 27/587 226/113 |
| 5,604,992 A | * | 2/1997 | Robinson | A47K 10/485 242/560 |

(Continued)

*Primary Examiner* — Joseph H Feild
*Assistant Examiner* — Rufus C Point
(74) *Attorney, Agent, or Firm* — Moore & Van Allen PLLC; Samuel C. Merritt; Thomas R. Parker, II (57) ABSTRACT

An apparatus, product monitoring system, and a method of measuring an amount of product on a roller are provided. The method includes receiving a first position distance between a position sensor and an exterior edge of the roller. The method also includes comparing the first position distance with a predetermined position distance. The predetermined position distance defines the distance between the position sensor and the exterior edge of the roller at a specific amount of product left on the roller. The method further includes determining the amount of product left on the roller based on the comparison of the first position distance and the predetermined position distance. The method still further includes causing the transmission of a signal relating to the amount of product left on the roller.

20 Claims, 10 Drawing Sheets

(56) References Cited

U.S. PATENT DOCUMENTS

| | | | | |
|---|---|---|---|---|
| 6,360,181 B1* | 3/2002 | Gemmell | ............... | G07F 9/002 702/128 |
| 7,213,782 B2 | 5/2007 | Osborne | ............. | B65H 16/106 242/563 |
| 7,793,589 B2 | 9/2010 | Nadolny | ................ | B41F 35/00 101/483 |
| 10,506,901 B2* | 12/2019 | Schuh | ................ | A47K 10/3612 |
| 11,071,416 B2* | 7/2021 | Hollister | ................ | G01S 7/003 |
| 2001/0024585 A1* | 9/2001 | Koakutsu | ............. | G06F 3/1204 400/76 |
| 2003/0197086 A1* | 10/2003 | Denen | ................ | B65H 19/126 242/559.2 |
| 2004/0173764 A1* | 9/2004 | Sekino | ................ | B41J 11/0075 250/559.36 |
| 2005/0171634 A1* | 8/2005 | York | ................ | G07F 11/68 700/231 |
| 2006/0173576 A1* | 8/2006 | Goerg | ............... | A47K 10/3662 700/236 |
| 2008/0105150 A1* | 5/2008 | Nadolny | ................ | B41F 35/00 101/485 |
| 2009/0152793 A1* | 6/2009 | Ito | ................ | B65H 16/021 271/8.1 |
| 2011/0012978 A1* | 1/2011 | Kawashima | ............... | B41J 2/32 347/218 |
| 2011/0253829 A1* | 10/2011 | Goeking | ............ | A47K 10/3625 700/232 |
| 2012/0072617 A1* | 3/2012 | Miyasaka | ............. | G06F 13/387 710/17 |
| 2012/0170067 A1* | 7/2012 | Watanabe | ................ | G06F 3/1285 358/1.13 |
| 2013/0298431 A1* | 11/2013 | Hiraoka | ................ | B65H 20/30 38/52 |
| 2014/0367401 A1* | 12/2014 | Stralin | ................ | A47K 10/38 221/6 |
| 2014/0367508 A1* | 12/2014 | Verdugo | ............. | B41J 11/0075 242/563.1 |
| 2015/0157177 A1* | 6/2015 | Carper | ............. | A47K 10/3656 242/570 |
| 2017/0043596 A1* | 2/2017 | Motoyama | ............... | B26D 3/14 |
| 2017/0057775 A1* | 3/2017 | Kobs | ................ | A47K 10/3625 |
| 2017/0106647 A1* | 4/2017 | Inoue | ................ | B41J 2/04586 |
| 2017/0266965 A1* | 9/2017 | Goh | ................ | B41J 2/2135 |
| 2018/0191732 A1* | 7/2018 | Erciyes | ................ | H04L 63/107 |
| 2018/0263435 A1* | 9/2018 | Osborne, Jr. | ........ | B65H 35/006 |
| 2018/0325333 A1* | 11/2018 | Murphy | ............. | A47K 10/26 |
| 2018/0368628 A1* | 12/2018 | Schuh | ................ | A47K 10/3612 |
| 2019/0118570 A1* | 4/2019 | Kato | ................ | D21H 21/48 |
| 2020/0352399 A1* | 11/2020 | Murphy | ................ | A47K 10/16 |

* cited by examiner

PRODUCT MONITORING DEVICE

CROSS-REFERENCE TO RELATED APPLICATION

This application is a continuation of U.S. Non-Provisional application Ser. No. 16/829,739, filed Mar. 25, 2020, which claims priority to and the benefit of U.S. Provisional Application No. 62/823,003, filed Mar. 25, 2019, each of which is incorporated herein by reference in its entirety.

FIELD

The present invention relates to a monitoring device which monitors product rolls, such as toilet paper. More specifically, this device uses distance sensors and communicates the quantity of products remaining on a roll and communicates this information wirelessly using little power.

BACKGROUND

It can be difficult to be aware of the status of product rolls, such as toilet paper, in public restrooms at a given time. Consumers are often left without toilet paper in public restrooms. Currently, time is often wasted for busy employees to monitor the levels of products remaining in restrooms. Through applied effort, ingenuity, and innovation, many of these identified problems have been solved by the methods and apparatus of the present disclosure.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In an example embodiment, a method of measuring an amount of product on a roller is provided. The method includes receiving a first position distance between a position sensor and an exterior edge of the roller. The method also includes comparing the first position distance with a predetermined position distance. The predetermined position distance defines the distance between the position sensor and the exterior edge of the roller at a specific amount of product left on the roller. The method further includes determining the amount of product left on the roller based on the comparison of the first position distance and the predetermined position distance. The method still further includes causing the transmission of a signal relating to the amount of product left on the roller.

In some embodiments, the predetermined distance defines the distance between the position sensor and the exterior edge of the roller in an instance in which no product is left on the roller or an instance in which the product roll is new. In some embodiments, the exterior edge is defined along the circumference of the roller. In some embodiments, the amount of product left on the roller is a percentage of a full roll of product. In some embodiments, the first position distance is determined via a time of flight sensor. In some embodiments, the first position distance is received via a network. In some embodiments, the position sensor is positioned above the product roll.

In some embodiments, the transmission of a signal relating to the amount of product left on the roller includes at least one of a graphical or numerical representation of the amount of product left. In some embodiments, the transmission of a signal relating to the amount of product left on the roller includes a notification in an instance a certain amount of product is remaining. In some embodiments, a plurality of position sensors are disposed within a single housing, wherein each of the position sensors are configured to determine the position distance of a different product roll.

In another example embodiment, an apparatus including a monitoring device, at least one processor, and at least one non-transitory memory including computer program code instructions is provided. The computer program code instructions configured to, when executed, cause the apparatus to receive a first position distance between a position sensor and an exterior edge of the roller. The computer program code instructions are also configured to, when executed, cause the apparatus to compare the first position distance with a predetermined position distance. The predetermined position distance defines the distance between the position sensor and the exterior edge of the roller at a specific amount of product left on the roller. The computer program code instructions are further configured to, when executed, cause the apparatus to determine the amount of product left on the roller based on the comparison of the first position distance and the predetermined position distance. The computer program code instructions are still further configured to, when executed, cause the apparatus to cause the transmission of a signal relating to the amount of product left on the roller.

In some embodiments, the predetermined distance defines the distance between the position sensor and the exterior edge of the roller in an instance in which no product is left on the roller or an instance in which the product roll is new. In some embodiments, the exterior edge is defined along the circumference of the roller. In some embodiments, the amount of product left on the roller is a percentage of a full roll of product. In some embodiments, the first position distance is determined via a time of flight sensor. In some embodiments, the first position distance is received via a network. In some embodiments, the position sensor is positioned above the product roll.

In some embodiments, the transmission of a signal relating to the amount of product left on the roller includes at least one of a graphical or numerical representation of the amount of product left. In some embodiments, the transmission of a signal relating to the amount of product left on the roller includes a notification in an instance a certain amount of product is remaining. In some embodiments, a plurality of position sensors are disposed within a single housing, wherein each of the position sensors are configured to determine the position distance of a different product roll.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

Having thus described certain example embodiments of the present disclosure in general terms, reference will here- inafter be made to the accompanying drawings, which are not necessarily drawn to scale, and wherein:

FIG. 1 illustrates an example apparatus for use in various embodiments of the present disclosure;

FIG. 2A illustrates an example monitoring system in accordance with various embodiments of the present disclosure;

FIG. 2B illustrates another example monitoring system in accordance with various embodiments of the present disclosure;

FIG. 3A illustrates the exterior of an example monitoring sensor in accordance with various embodiments of the present disclosure;

FIG. 3B is an exploded view of the example monitoring sensor shown in FIG. 4A in accordance with various embodiments of the present disclosure;

FIG. 3C is a transparent view of the example monitoring sensor shown in FIG. 4A in accordance with various embodiments of the present disclosure;

FIG. 4A illustrates an example monitoring sensor positioned relative to a roll of toilet paper in accordance with various embodiments of the present disclosure;

FIG. 4B illustrates an example monitoring sensor configured to monitor multiple rolls of toilet paper in accordance with various embodiments of the present disclosure;

FIG. 4C illustrates an example monitoring sensor monitoring the amount of toilet paper remaining based on position in accordance with various embodiments of the present disclosure; and FIG. 5 is a flowchart of a method of operating a monitoring system in accordance with various embodiments of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Managing product usage is integral for optimizing usage. Therefore, real-time monitoring of product usage may assist in various use cases, such as toilet paper usage. The product monitoring device discussed herein is either installed into a dispenser or manufactured into a dispenser. Various embodiments discussed herein provided a monitoring system configured to optimize product usage, while also minimizing instances in which product shortages occur. For example, for toilet paper dispensers or paper towel rolls, there may be no time periods in which a given dispenser should be empty. As such, the present disclosure allows for an improved tracking system configured to reduce such instances. Product monitoring devices discussed herein may be capable of measure various types of roll-based technology, such as toilet paper, paper towels, trash bags, and/or the like.

Example Apparatus Configuration

Figure 1:
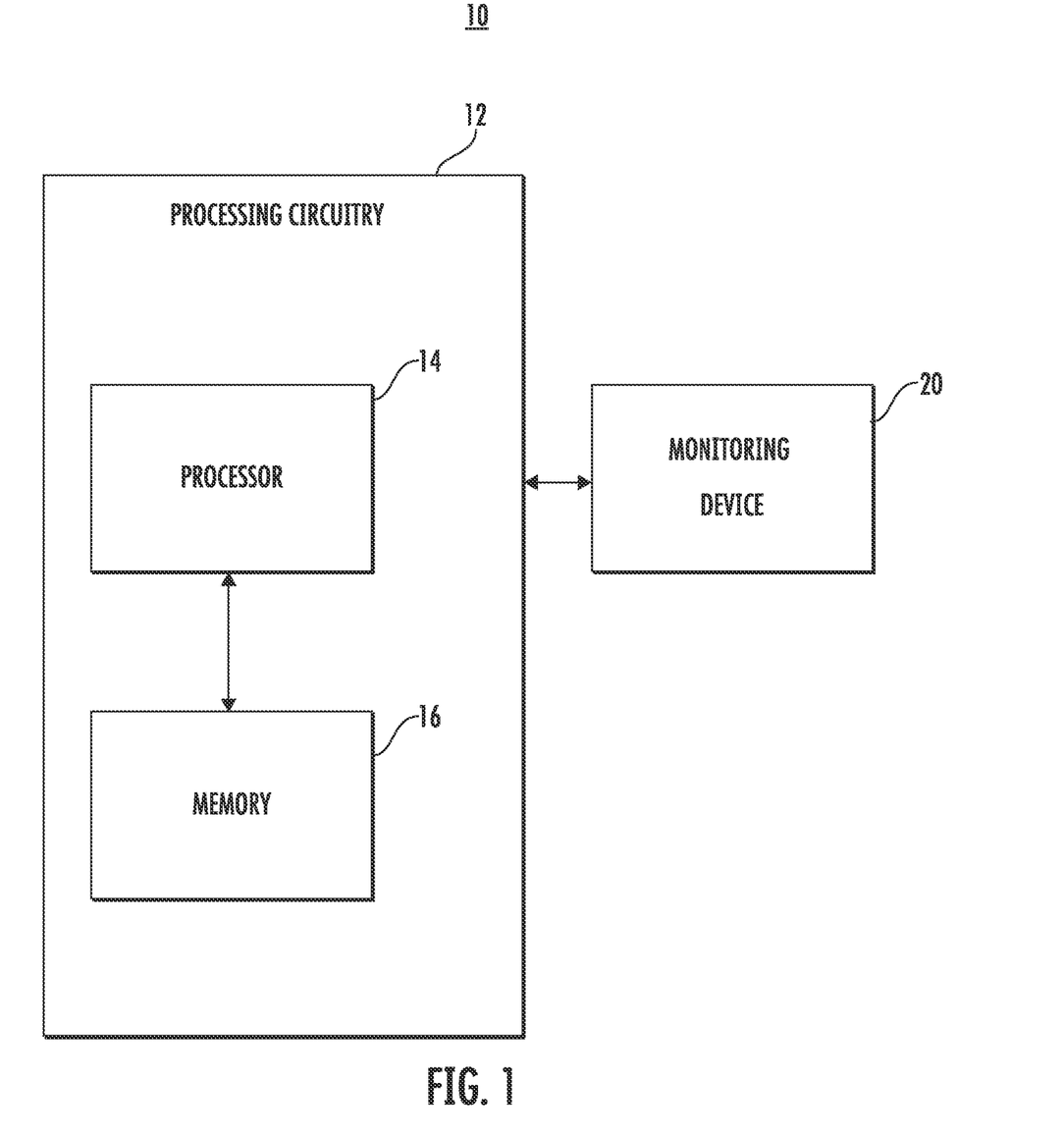

FIG. 1 is a schematic diagram of an example apparatus configured for performing any of the operations described herein. Apparatus 10 is an example embodiment that may be embodied by or associated with any of a variety of computing devices that include or are otherwise associated with a device configured for providing advanced sensory features, which may include a monitoring device 20. In various embodiments, one or more components of the apparatus 10 may be housed independently of other components (e.g., in communication with one another).

The apparatus 10 may include, be associated with, or may otherwise be in communication with a communication interface (not shown), processor 14, a memory device 16, and a monitoring device 20. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. In some embodiments, the processor 14 may be embodied as one or more processing components (e.g., at least one processor) in a single device or distributed across several devices. A multi-core processor may enable multiprocessing within a single physical package. Additionally or alternatively, the processor may include one or more processors configured in tandem via the bus to enable independent execution of instructions, pipelining and/or multithreading. In some embodiments, each electrode may be in electrical communication with a separate processor and/or memory configured to collectively perform the functions described herein. Portions of the at least one processor 14 may be powered, while other portions of the at least one processor may remain unpowered during some or all of the detection process.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The monitoring device 20 may be configured with one or more position sensors 350 (shown in FIG. 3B-3C) configured to determine the distance between the position sensor and the edge of a product (e.g., edge of a toilet paper roll). As discussed in more detail below, the position sensor may be an ultrasonic sensor, a laser sensor, a time of flight sensor, and/or the like. Additionally, the monitoring device 20 may be configured with communication capabilities, such as Wi-Fi, LoRa, Bluetooth, and/or the like, to communication with the processing circuitry 12. In some embodiments, at least a portion of the processing circuitry 12 may be disposed within the monitoring device 20 (e.g., the circuit board of the monitoring device may be configured to carry out one or more operations discussed herein).

Figure 2A:
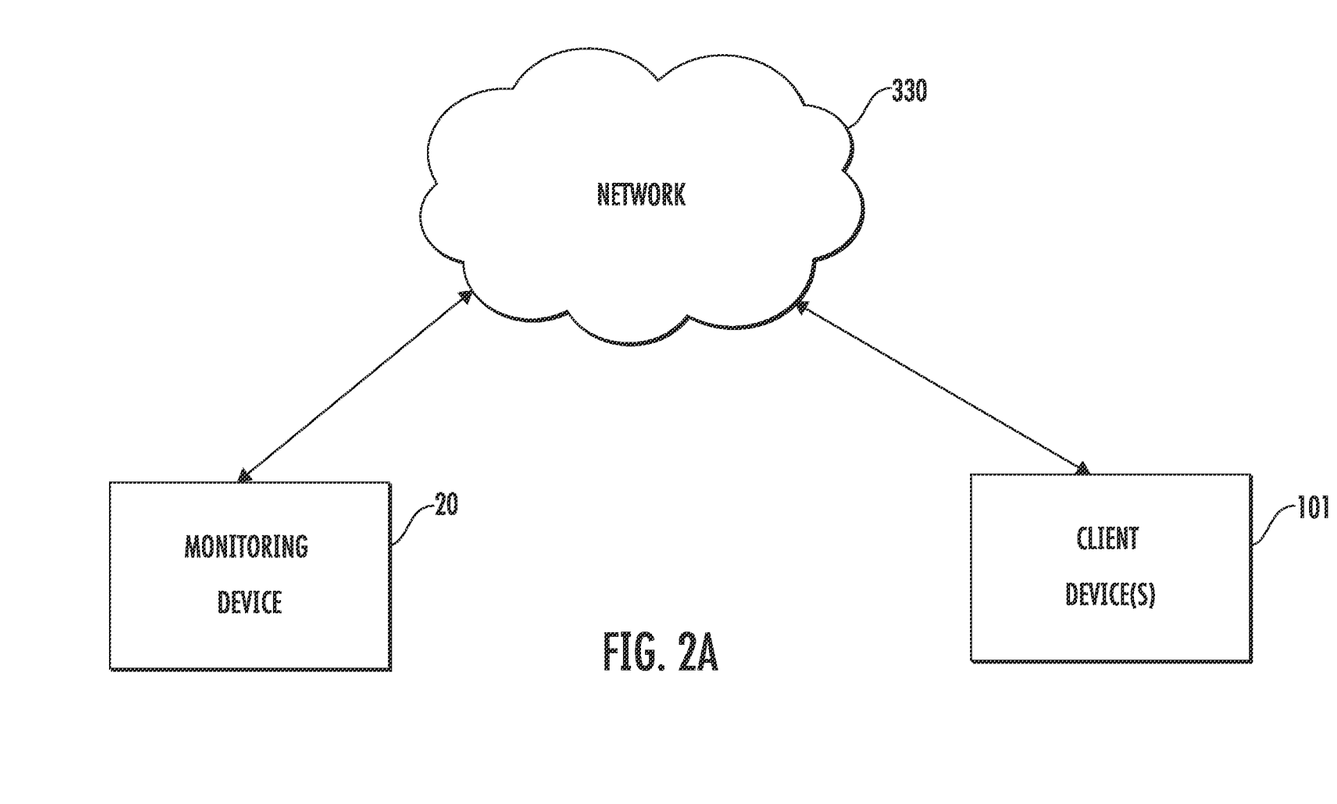

FIG. 2A is an example diagram of a monitoring system in accordance with an example embodiment. As shown, the monitoring device 20 may be connected via a network 330 to one or more client devices 101. In various embodiments, the monitoring device 20 may be connected to the network via a wireless communication (e.g., Wi-Fi, Bluetooth, LoRa, and/or the like). In various embodiments, a client device 101 may be defined be one or more types of user interfaces configured to provide information relating to product roll amount in accordance with various embodiments. For example a client device 101 may be one of a mobile phone, tablet, computer, and/or the like. In various embodiments, a client device 101 may be capable of monitoring more than one monitoring device 20 during operations. For example, one client device 101 may have access to each monitoring device 20 for a given area or building. In some embodiments, the client device 101 may receive information from the monitoring device 20 indirectly. For example, the data relating to the product roll amount may be transmitted to the network 330 and at least temporarily stored on a server. In some embodiments, at least a portion of the processing circuitry 12 (e.g., the processor 14 and/or memory 16) may be disposed on the client device 101. For example, the client device 101 may receive raw data from the monitoring device 20 and carry out one or more operations discussed herein.

Figure 2B:
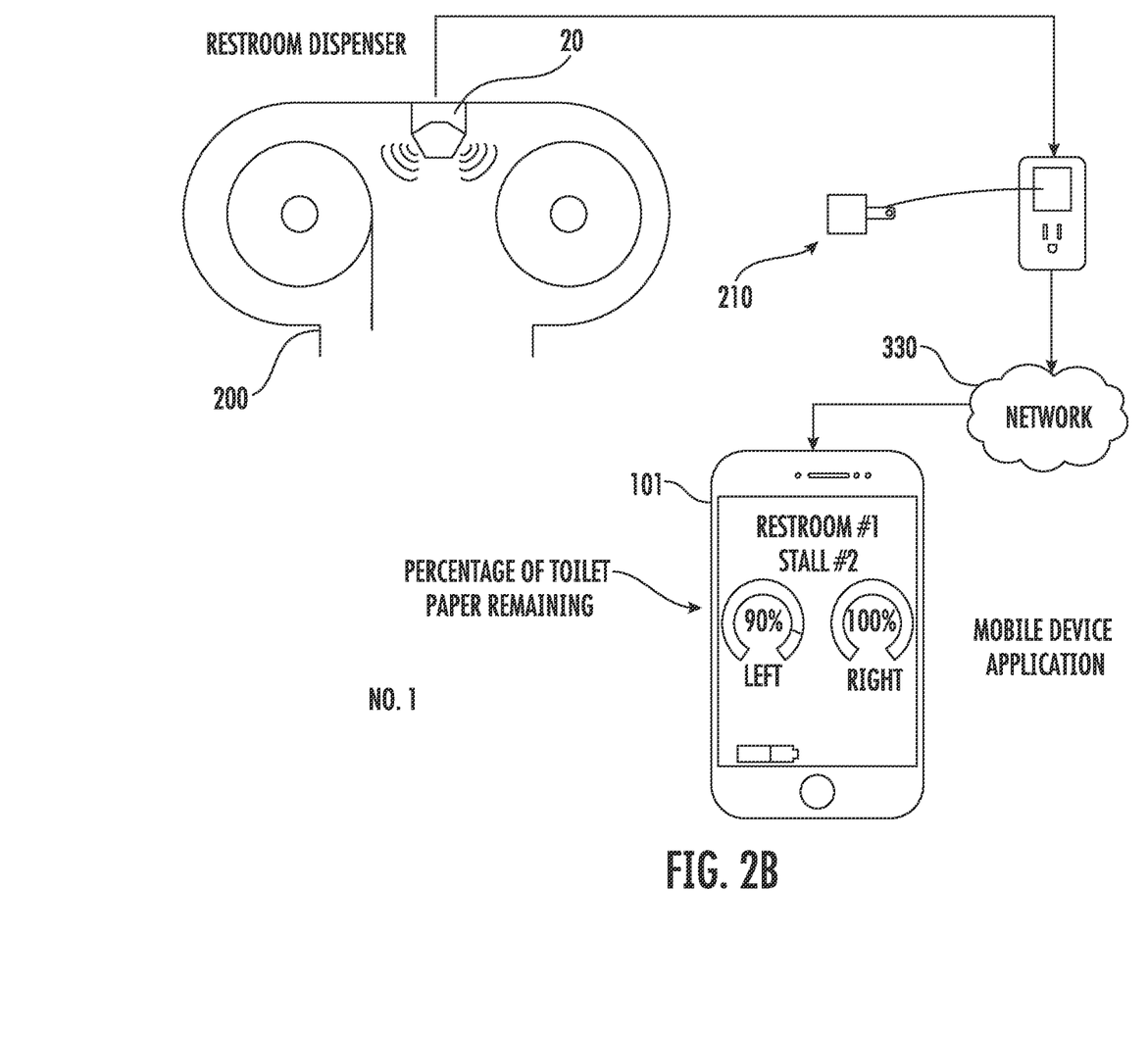

FIG. 2B shows a specific embodiment of the present disclosure in accordance with the present disclosure. As shown, the monitoring device 20 is installed in a two-toilet paper roll container 200 (e.g., positioned with multiple monitoring sensors as discussed below to monitor both rolls during operation). In various embodiments, the monitoring device 20 may be connected to a gateway 210. In various embodiments, the gateway 210 may connect the monitoring device 20 with the network 330. In various embodiments, one or more client devices 101 (e.g., the mobile phone shown) may be connected to the network 330 and configured to display information to the user. In some embodiments, the information may be provided to the client device 101 within an application.

In some embodiments, the information may be provided to the client device 101 via other communication methods (e.g., via text, email, and/or other typical communication procedures). As shown, the product roll level may be shown in the form of a percentage remaining. In some embodiments, the product roll level may be displayed numerically and/or graphically. In some embodiments, the additional information relating to the product roll may be provided. For example, the estimated time remaining for a given roll, historical usage amount, and/or the like may be provided to the user interface of the client device 101. In some embodiments, the client device 101 may receive one or more notifications relating to the product roll amount during operation. For example, the client device 101 may receive a text message, email, push notification, and/or the like in an instance in which one or more product roll rolls are at a given usage levels (e.g., a notification may be sent when the product roll is less than 30% full and therefore may need to be replaced soon). In some embodiments, a user may be able to select instances in which a notification is received. For example, a company may have a protocol to replace any roll with less than 5% product remaining and therefore the user may select to receive notifications when a given product roll is at or near 5% in order to replace said roll before the roll is completely empty.

In various embodiments, data obtained by a monitoring device 20 may be stored and/or provided to a user. In various embodiments, data tracked over a set amount of time may be used to predict future usage. For example, the amount of time that a product roll is operation between the time installed and the time at which the product roll is emptied may be generally consistent, such that the amount of product roll remaining may be used to estimate the amount of time until the product roll is emptied. Additionally, the data collected over time may be presented to a client device in numerical and/or graphical form, such that a user may be able to order new materials based on usage patterns. For example, different days of the week may have different usage rates, such that a janitor may know that certain bathroom stalls may need to have toilet paper rolls changed more frequently. In various embodiments, the usage data collected may be processed such that various other predictions and/or estimates may be made by the monitoring device 20.

Figure 3A:
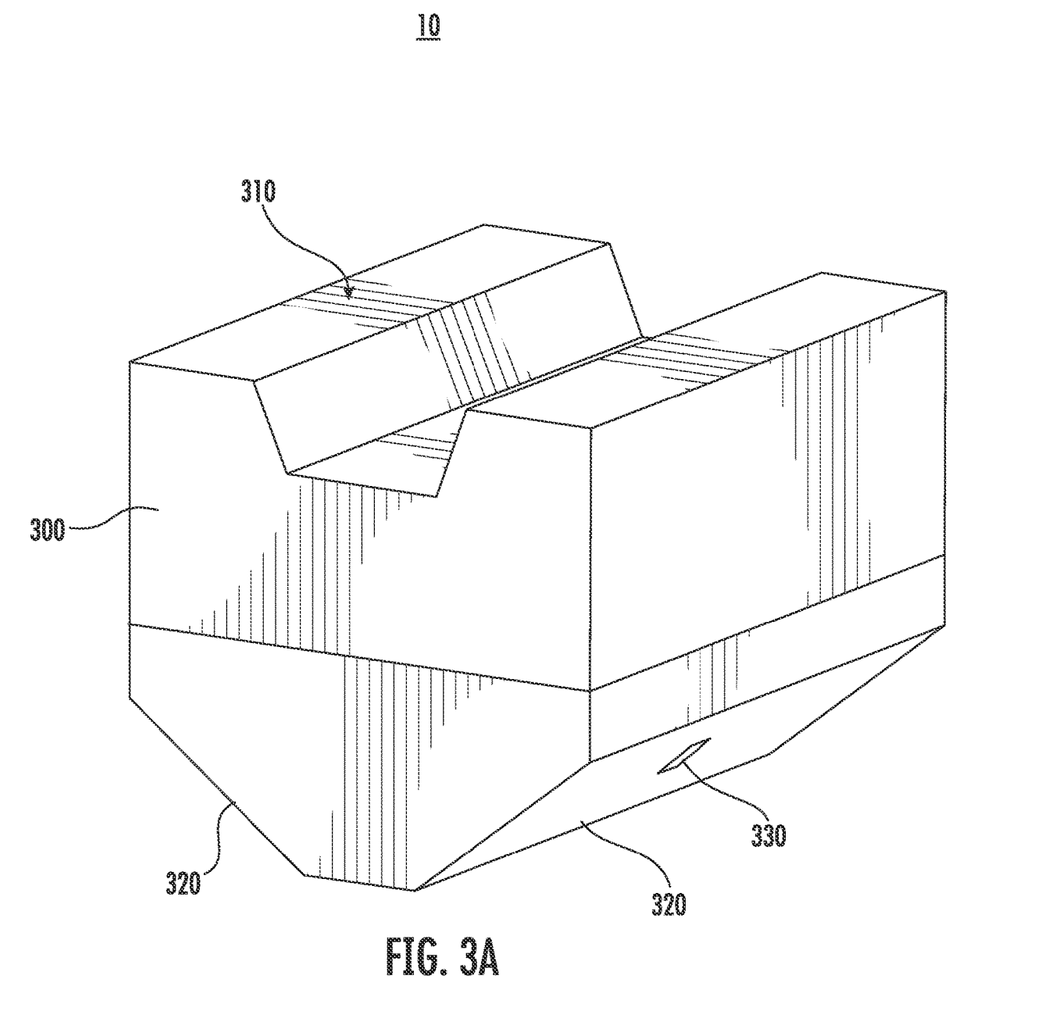
Figure 3B:
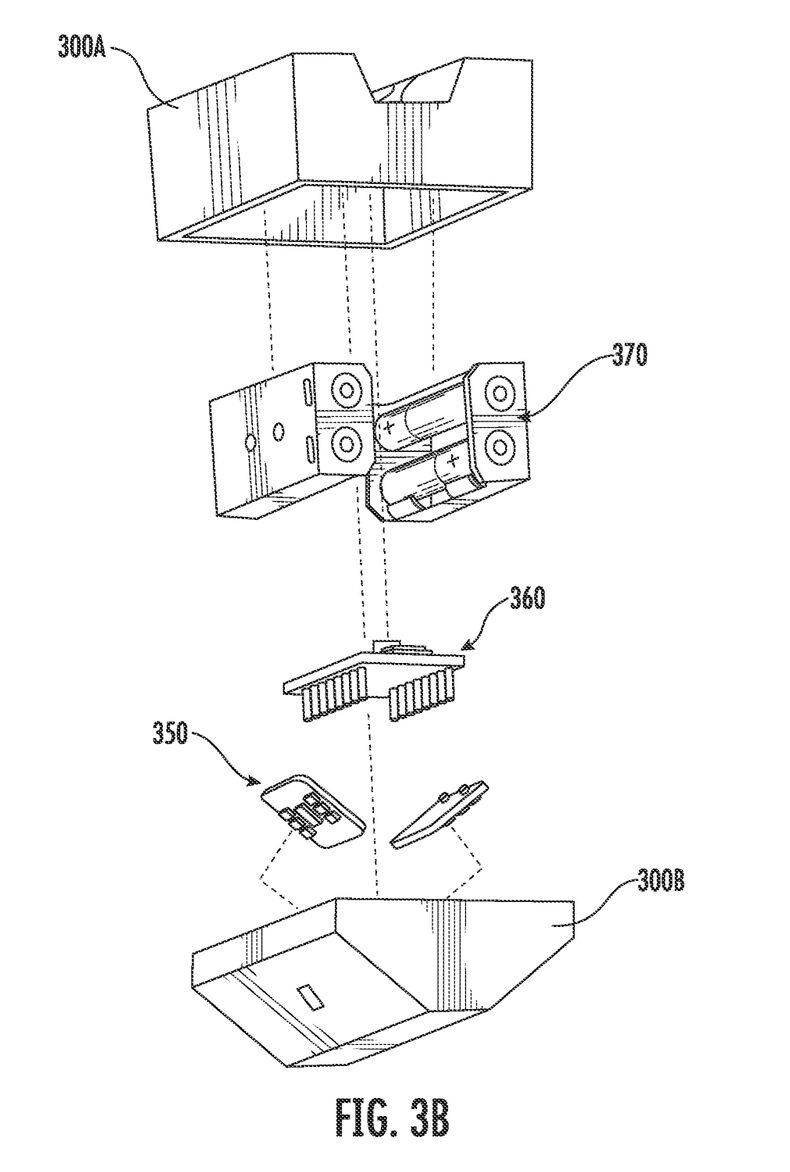
Figure 3C:
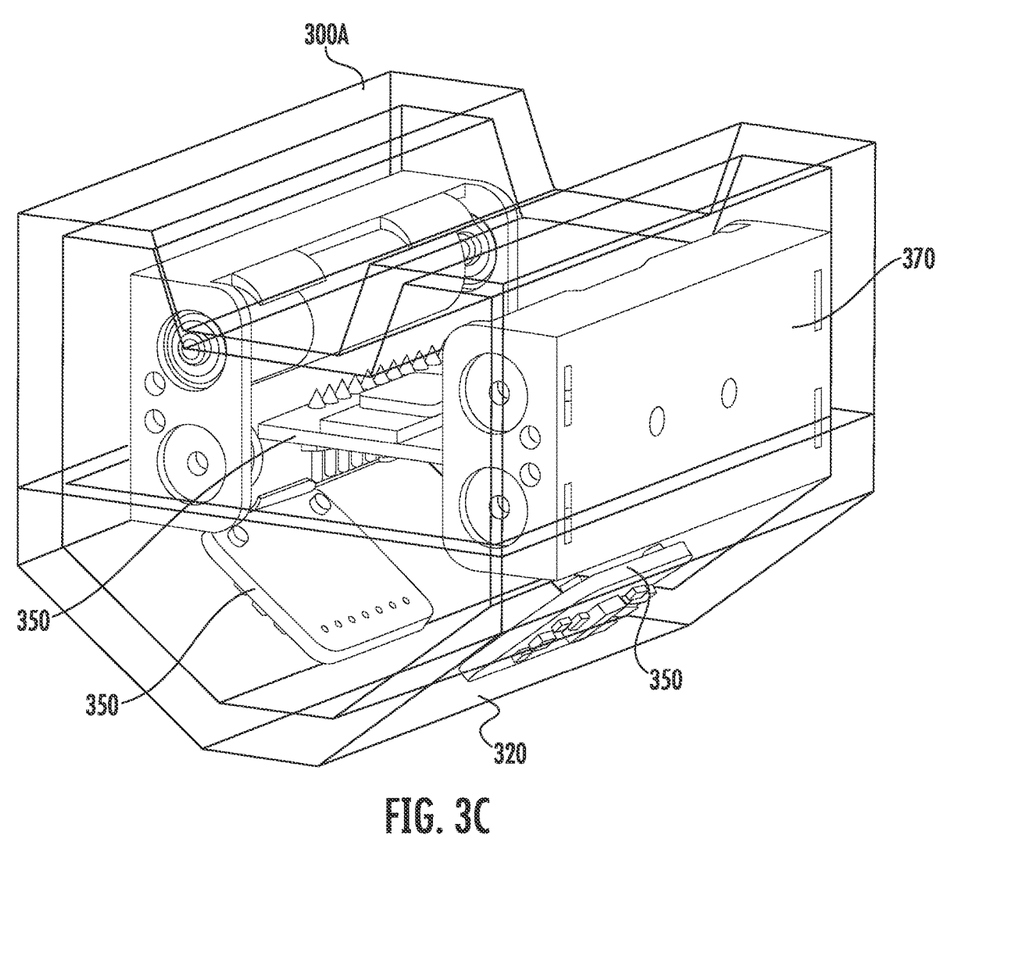

FIGS. 3A-3C are various views of a monitoring device 20 configured to monitor two adjacent product rolls. As shown in FIG. 3A, the monitoring device 20 may define an exterior housing 300. In various embodiments, the exterior housing 300 may be a molded plastic configured with one or more pieces (e.g., multiple molded pieces may fit together to form the housing 300). In various embodiments, the housing 300 may define one or more attachment surfaces 310 configured to attach to another surface, for example, to the interior of a product dispenser (e.g., as shown in FIG. 4B). In various embodiments, the attachment surface 310 may be shaped dependent on a given case. For example, as shown, the attachment surface may define an insert based on the interior of a given product dispenser.

In various embodiments, the exterior housing 300 may define one or more monitoring surfaces 320 configured with an interface for the monitoring sensor to access the product. For example, in an instance the monitoring sensor is a laser sensor, the monitoring surface 320 may define an aperture 335 such that the laser may access a given product roll. In various embodiments, the monitoring surface 320 may be positioned approximately perpendicular to the exterior edge of a given product roll (e.g., perpendicular to the tangent of the exterior edge of product roll). In various embodiments, the angle of the monitoring surface 320 may be based on the position of the monitoring device, the number of sensors in a given monitoring device, and/or the like. For example, the angle of the monitoring surface 320 may be optimized based on the position of the monitoring device within the product dispenser.

FIG. 3B illustrates an exploded view of an example monitoring device 20 in accordance with an example embodiment and FIG. 3C illustrates the example monitoring device 20 with the exterior housing transparent in order to see the positioning of the interior components. As shown, the monitoring device 20 may include the exterior housing 300 (e.g., a top housing 300A and a bottom housing 300B), one or more sensors 350, a circuit board with communication capabilities 360, and a power source 370. As shown in FIG. 3C, the one or more sensors 350 may be positioned along the interior of the monitoring surface 320, such that the sensor 350 can access the product roll via the given monitoring surface aperture 335. In various embodiments, the sensor(s) 350 may be in communication with a circuit board 360 within the exterior housing 300. In various embodiments, at least a portion of the processing circuitry 12 may be disposed on the circuit board 360. In various embodiments, the circuit board 360 includes communication capabilities (e.g., Bluetooth, Wi-Fi, LoRa, and/or the like), such that sensor information may be transmitted (e.g., to the network 330 directly or indirect, such as via a gateway). In various embodiments, the monitoring device 20 may include a power source 370 within the monitoring device. As shown, the power source may be a battery providing power to the monitoring device 20. Other power sources may also be contemplated (e.g., a monitoring device may be hard wired). For example, a photovoltaic solar cell may be used to recharge the power source during operations. In various embodiments, the monitoring device 20 may be self-contained within the exterior housing 300. In various embodiments, the monitoring device 20 may include an attachment mechanism (e.g., adhesive or the like) to attach to a product dispenser or the like. Alternatively, the monitoring device 20 may be integral to a product dispenser (e.g., the exterior housing 300 may be a part of the product dispenser).

Figure 4A:
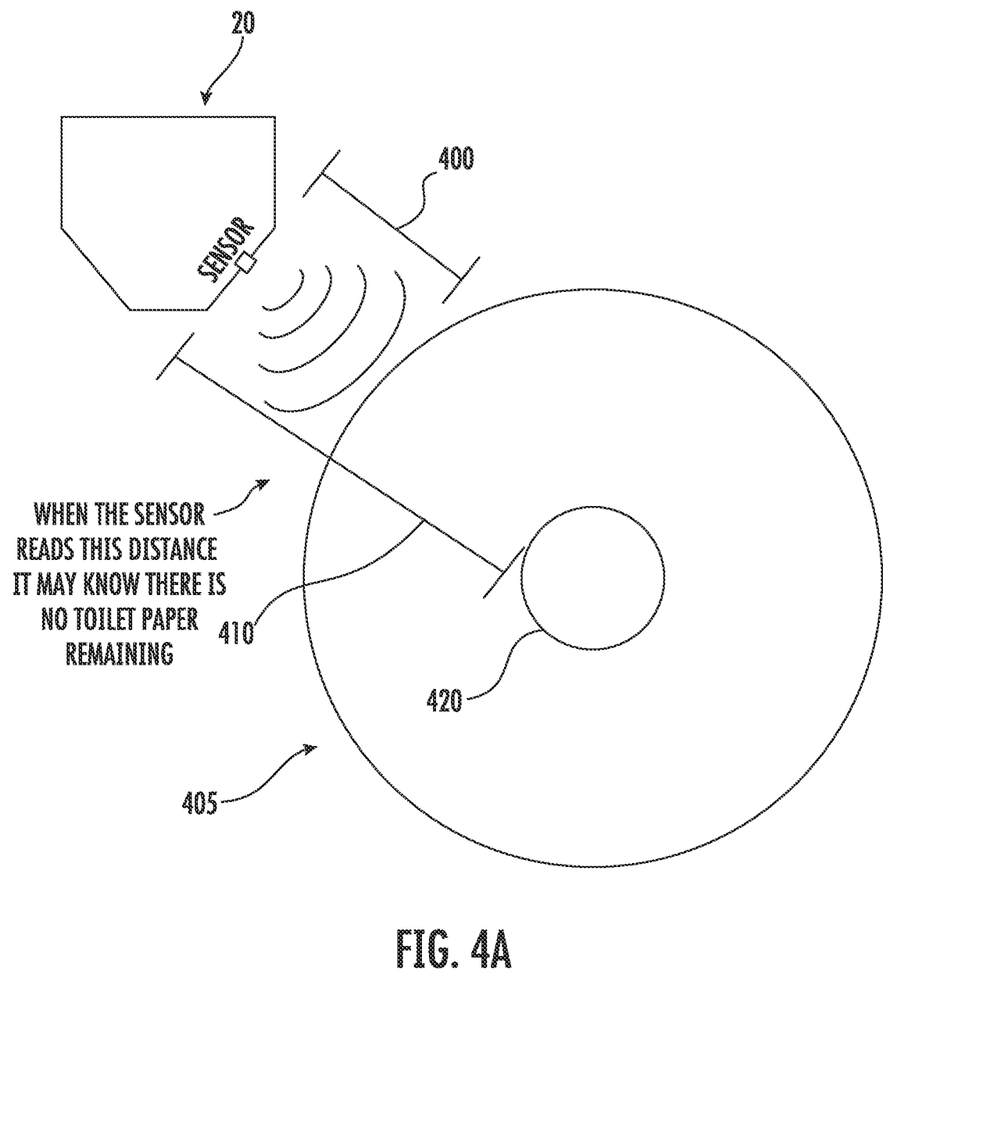
Figure 4B:
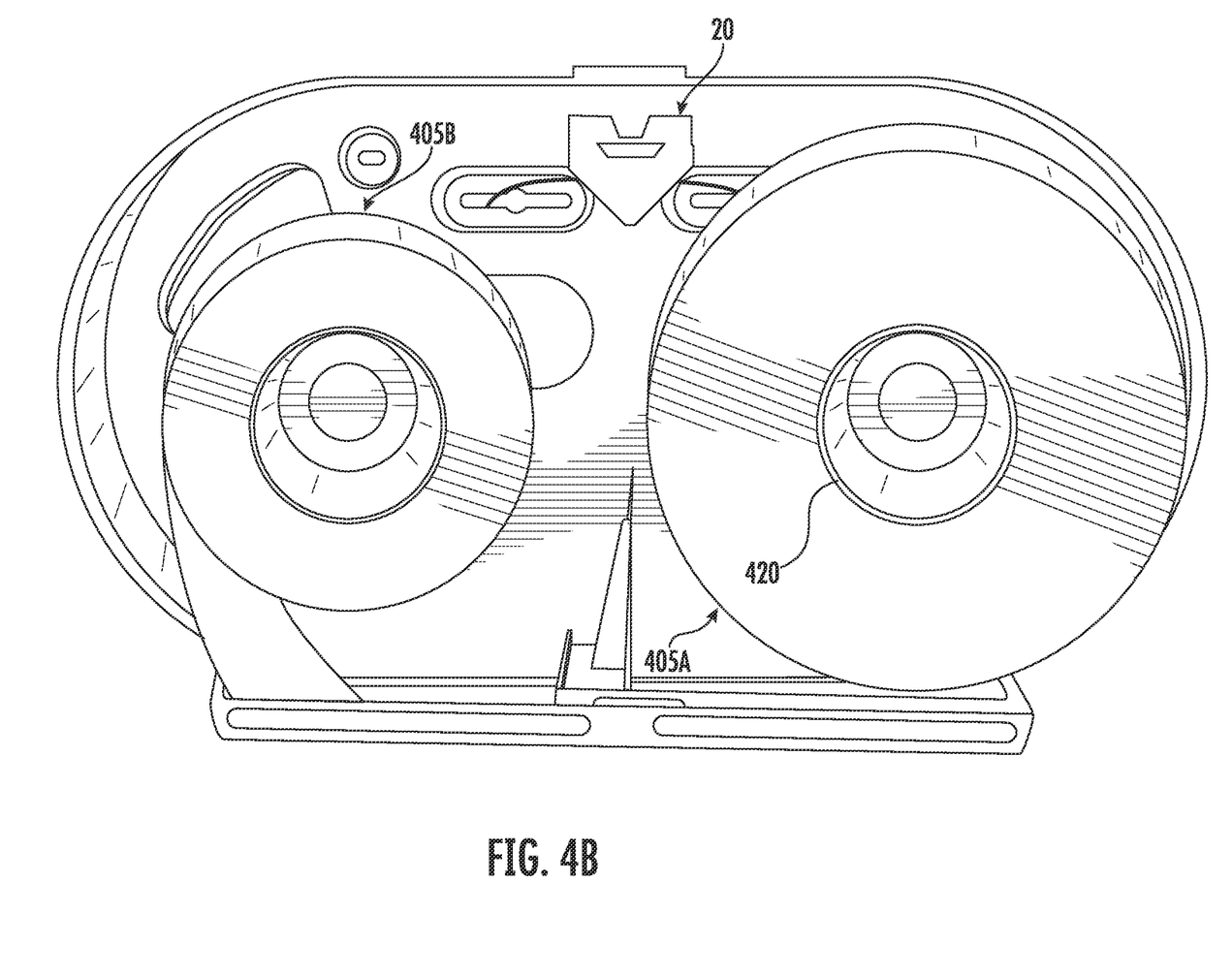
Figure 4C:
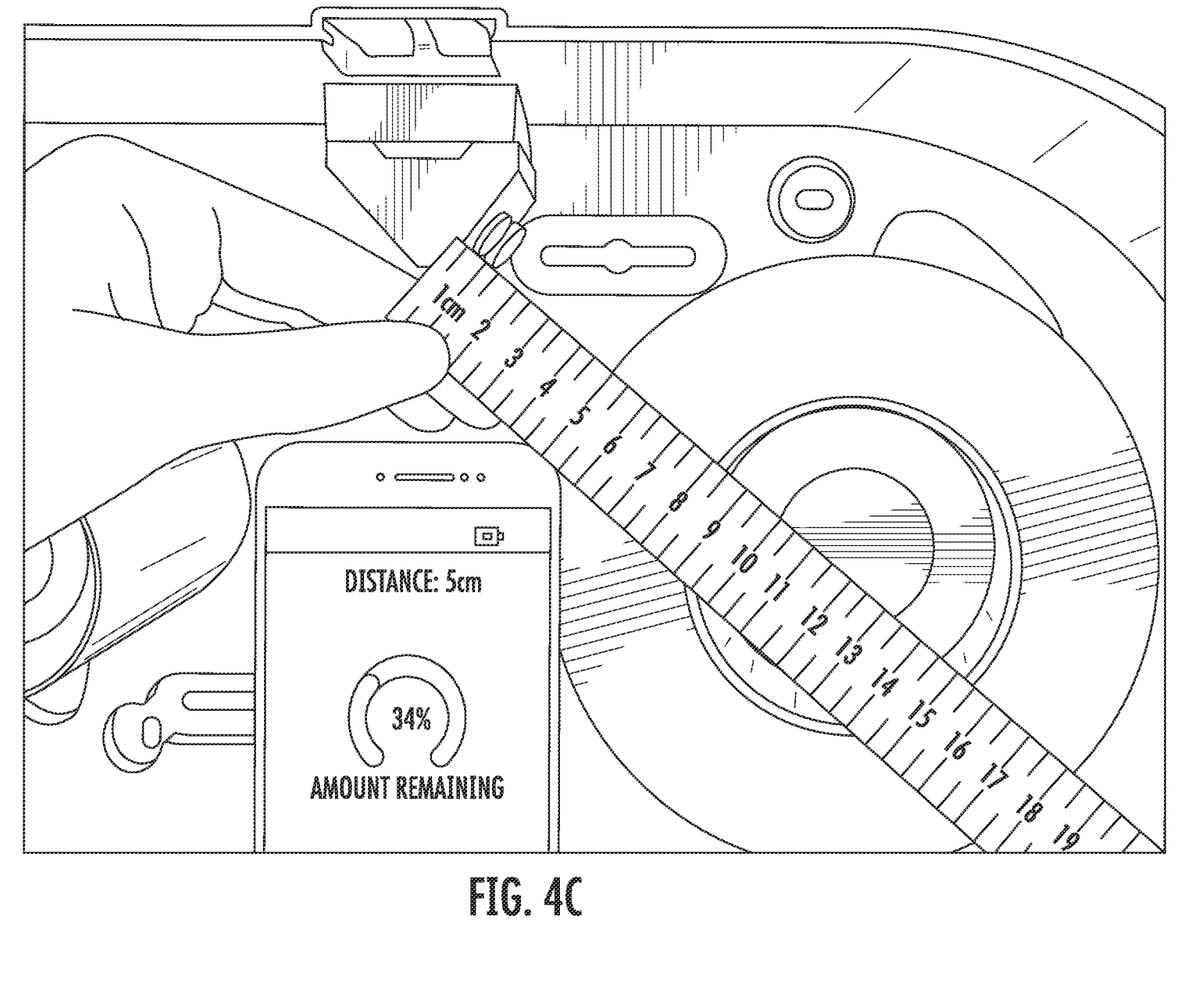

FIGS. 4A-4C are example use cases for the monitoring device in accordance with various embodiments. As discussed in more detail below, the monitoring device 20 may be positioned to monitor a product roll 405. In some embodiments, the distance between the sensor and the core of the product roll 420 may be a known, predetermined position distance. In some embodiments, additional position distances may be known that correspond to a given roll amount. For example, the distance between the sensor and the roll in an instance in which the product roll is full may also be known. In some embodiments, the one or more known position distances may be determined during operations (e.g., the position distance between the sensor and a full roll may be reset in an instance in which the roll is replaced). As shown in FIG. 4B, the monitoring device 20 may be positioned between multiple rolls 405A, 405B (e.g., with an individual sensor 350 for each roll). While the monitoring device 20 is positioned at the top of the dispenser in the figures, in various embodiments, the monitoring device 20 may be positioned at different locations within the dispenser (e.g., as long as the sensor 350 remains approximately perpendicular to the surface of the product roll). FIG. 4C shows the distance that is being measured by the sensor. As shown, the position sensor 350 is reading 5 centimeters (e.g., on the user interface), which corresponds to the actual distance shown by the ruler. Additionally, the distance may then be used to determine the remaining amount product for a given roll (e.g., as shown, the product roll may have 34% remaining at an instance in which the position distance is 5 centimeters).

Figure 5:
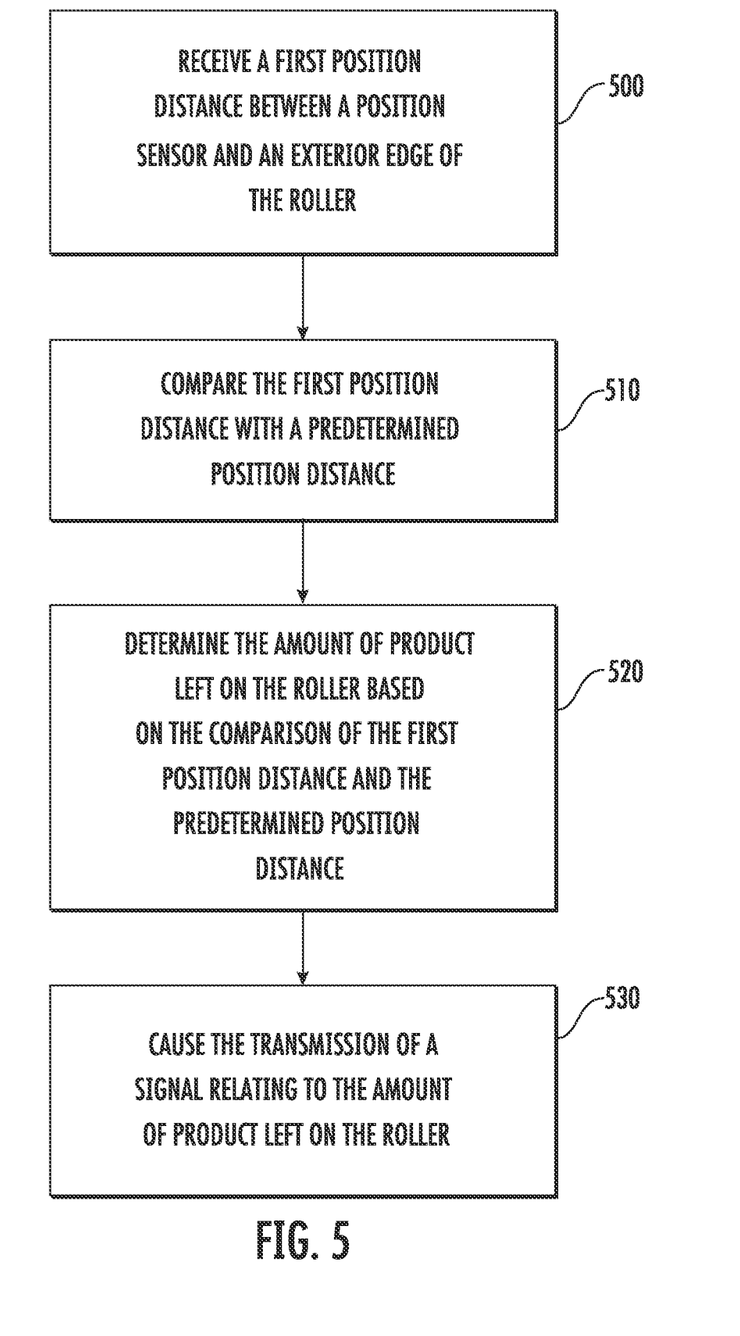

FIG. 5 is a flow chart illustrating an example operation using monitoring devices 20 discussed herein. Referring to Block 500 of FIG. 5, the monitoring system includes means, such as the processing circuitry 12, the processor 14, or the like, for receiving a first position distance between a position sensor and an exterior edge of the roller. In various embodiments, the first position distance may be captured by the monitoring device 20. In the example shown in FIG. 4A, the first position distance 400 is defined as the distance between the monitoring sensor 350 and the exterior edge of the product roll 420 at any given time. In various embodiments, the first position distance may be related to the amount of product remaining on the roll. For example, as the roll of product is used, the first position distance may increase.

Referring now to Block 510 of FIG. 5, the monitoring system includes means, such as the processing circuitry 12, the processor 14, or the like, for comparing the first position distance with a predetermined position distance. In some embodiments, the predetermined position distance defines the distance between the position sensor and the exterior edge of the roller at a specific amount of product left on the roller. In various embodiments, the predetermined position distance may define an instance in which the roll is empty and/or full. In some embodiments, the predetermined position distance may be known based on a given use case (e.g., a standard product roll may be used, such that the predetermined position distance is consistent for every roll). Additionally or alternatively, the predetermined product may be obtained by the position sensor (e.g., the monitoring system may generate the predetermined distance at an instance in which the roll is known to be empty and/or full).

Referring now to Block 520 of FIG. 5, the monitoring system includes means, such as the processing circuitry 12, the processor 14, or the like, for determining the amount of product left on the roller. In some embodiments, the determination of the amount of product left on the roller may be based on the comparison of the first position distance and the predetermined position distance. In some embodiments, in an instance in which a given roll is replaced, the product amount may reset to 100% and then be compared to the predetermined position distance. For example, in an instance in which the predetermined position distance is the distance in an instance the roll is empty, the amount of product may be determined using said distance in comparison to the real-time distance.

Referring now to Block 530 of FIG. 5, the monitoring system includes means, such as the processing circuitry 12, the processor 14, or the like, for causing the transmission of a signal relating to the amount of product left on the roller. In various embodiments, the transmission may include information such as amount of product remaining, estimated time until empty, a usage over time, and/or the like.

Blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Various operations discussed herein may be carried out by a controller with a processor or the like. As such, the operations may be autonomous (e.g., a program determines the operations of the shuttle) and/or manual (e.g., a user may control at least a portion of the shuttle operations discussed herein). As discussed above, the operations discussed herein allow for a reduction in required reserve spaces and/or reduces the amount of unnecessary operations performed by the shuttles during operation. Various embodiments discussed herein allow for more efficient retrieval and storage using an AS/RS.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance unless otherwise noted, but rather the terms first, second, etc. are used to distinguish one element from another.

In accordance with various aspects of the disclosure, an element, or any portion of an element, or any combination of elements may be implemented with a "processor." The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processor may be configured to execute instructions stored in a memory device or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method of measuring an amount of product on a first roller and a second roller, the method comprising:
   receiving a first roller first position distance between a first position sensor and an exterior edge of the first roller;
   receiving a second roller first position distance between a second position sensor and an exterior edge of the second roller;
   comparing the first roller first position distance with a first predetermined position distance, wherein the first predetermined position distance defines the distance between the first position sensor and the exterior edge of the first roller at a specific amount of product left on the first roller;
   comparing the second roller first position distance with a second predetermined position distance, wherein the second predetermined position distance defines the distance between the second position sensor and the exterior edge of the second roller at a specific amount of product left on the second roller;

based on the comparison of the first roller first position distance and the first predetermined position distance, determining the amount of product left on the first roller;

based on the comparison of the second roller first position distance and the second predetermined position distance, determining the amount of product left on the second roller; and causing the transmission of a signal relating to the amount of product left on the first roller and the second roller, wherein the first position sensor and the second position sensor are disposed within a single housing, the single housing configured to be disposed between the first roller and second roller.

2. The method of claim 1, wherein the predetermined distance defines the distance between the position sensor and the exterior edge of the roller in an instance in which no product is left on the roller or an instance in which the product roll is new.

3. The method of claim 1, wherein the exterior edge is defined along the circumference of the roller.

4. The method of claim 1, wherein the amount of product left on the roller is a percentage of a full roll of product.

5. The method of claim 1, wherein the first position distance is determined via a time of flight sensor.

6. The method of claim 1, wherein the first position distance is received via a network.

7. The method of claim 1, wherein the position sensor is positioned above the product roll.

8. The method of claim 1, wherein the transmission of a signal relating to the amount of product left on the roller includes at least one of a graphical or numerical representation of the amount of product left.

9. The method of claim 1, wherein the transmission of a signal relating to the amount of product left on the roller includes a notification in an instance a certain amount of product is remaining.

10. The method of claim 1, wherein the transmission of a signal relating to the amount of product left on the first roller and the second roller is transmitted via LoRa.

11. An apparatus comprising a monitoring device, the monitoring device comprising a first position sensor and a second position sensor disposed within a single housing configured to be disposed between a first roller and a second roller, at least one processor, and at least one non-transitory memory including computer program code instructions, the computer program code instructions configured to, when executed, cause the apparatus to:

receive a first roller first position distance between a first position sensor and an exterior edge of the first roller;

receive a second roller first position distance between a second position sensor and an exterior edge of the second roller;

compare the first roller first position distance with a first predetermined position distance, wherein the first predetermined position distance defines the distance between the first position sensor and the exterior edge of the first roller at a specific amount of product left on the first roller;

compare the second roller first position distance with a second predetermined position distance, wherein the second predetermined position distance defines the distance between the second position sensor and the exterior edge of the second roller at a specific amount of product left on the second roller;

based on the comparison of the first roller first position distance and the first predetermined position distance, determine the amount of product left on the first roller;

based on the comparison of the second roller first position distance and the second predetermined position distance, determine the amount of product left on the second roller; and cause the transmission of a signal relating to the amount of product left on the first roller and the second roller.

12. The apparatus of claim 11, wherein the predetermined distance defines the distance between the position sensor and the exterior edge of the roller in an instance in which no product is left on the roller or an instance in which the product roll is new.

13. The apparatus of claim 11, wherein the exterior edge is defined along the circumference of the roller.

14. The apparatus of claim 11, wherein the amount of product left on the roller is a percentage of a full roll of product.

15. The apparatus of claim 11, wherein the first position distance is determined via a time of flight sensor.

16. The apparatus of claim 11, wherein the first position distance is received via a network.

17. The apparatus of claim 11, wherein the position sensor is positioned above the product roll.

18. The apparatus of claim 11, wherein the transmission of a signal relating to the amount of product left on the roller includes at least one of a graphical or numerical representation of the amount of product left.

19. The apparatus of claim 11, wherein the transmission of a signal relating to the amount of product left on the roller includes a notification in an instance a certain amount of product is remaining.

20. The apparatus of claim 11, wherein the transmission of a signal relating to the amount of product left on the first roller and the second roller is transmitted via LoRa.

* * * * *